(12) United States Patent
Peng

(10) Patent No.: US 8,588,036 B1
(45) Date of Patent: Nov. 19, 2013

(54) OPTICAL DEVICE INCLUDING INTERLAYER

(75) Inventor: Chubing Peng, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/531,795

(22) Filed: Jun. 25, 2012

(51) Int. Cl.
 *G11B 11/00* (2006.01)

(52) U.S. Cl.
 USPC .................. 369/13.03; 369/13.24; 369/13.32; 369/13.33; 369/13.38

(58) Field of Classification Search
 None
 See application file for complete search history.

(56) References Cited

U.S. PATENT DOCUMENTS

| | | | |
|---|---|---|---|
| 6,795,630 B2 | 9/2004 | Challener | |
| 6,980,374 B1 | 12/2005 | Schlesinger | |
| 7,580,602 B2 | 8/2009 | Itagi | |
| 7,864,434 B2 | 1/2011 | Peng | |
| 8,385,021 B2 * | 2/2013 | Hara et al. | 360/125.31 |
| 2007/0115787 A1 | 5/2007 | Itagi | |
| 2010/0074063 A1 | 3/2010 | Peng | |
| 2011/0176398 A1 * | 7/2011 | Tanaka et al. | 369/13.33 |

OTHER PUBLICATIONS

B. Richards and E. Wolf, "Electromagnetic Diffraction in Optical System II: Structure of the Image Field in an Aplanatic System," Proc. Roy. Soc. Ser. A 253, 358-379 (1959).

* cited by examiner

*Primary Examiner* — Muhammad N Edun
(74) *Attorney, Agent, or Firm* — Mueting Raasch & Gebhardt PA

(57) ABSTRACT

A device including a waveguide, the waveguide having a first portion where energy having a wavelength, $\lambda$, enters and a second portion where the energy exits, the waveguide including a core layer with an index of refraction, $n1$; at least one cladding layer formed adjacent the core layer, the cladding layer having an index of refraction, $n2$; a reflective layer, the reflective layer positioned adjacent the first portion of the waveguide; and an interlayer, the interlayer positioned between the first portion of the waveguide and the reflective layer, the interlayer having an index of refraction, $n3$; wherein $n3$ is greater than $n2$.

20 Claims, 5 Drawing Sheets

OPTICAL DEVICE INCLUDING INTERLAYER

BACKGROUND

In thermally assisted magnetic/optical recording, information bits are recorded to a storage layer of a storage media at elevated temperatures. Generally, a spot or bit on the storage medium is heated to reduce its coercivity sufficiently so that an applied magnetic field or optical write signal can record data to the storage medium. Current methods of heating the storage media include directing and focusing energy onto the storage media. Different and more advantageous methods and devices for focusing the energy are needed in order to decrease the size of the heated spot in order to increase the storage density of the storage media.

SUMMARY

A device including a waveguide, the waveguide having a first portion where energy having a wavelength, $\lambda$, enters and a second portion where the energy exits, the waveguide including a core layer with an index of refraction, $n1$; at least one cladding layer formed adjacent the core layer, the cladding layer having an index of refraction, $n2$; a reflective layer, the reflective layer positioned adjacent the first portion of the waveguide; and an interlayer, the interlayer positioned between the first portion of the waveguide and the reflective layer, the interlayer having an index of refraction, $n3$; wherein $n3$ is greater than $n2$.

A device that includes an energy source, the energy having a wavelength $\lambda$; an optical system including one or more components configured to direct the energy from the energy source into an optical device, the optical device including a waveguide, the waveguide having a first portion where the energy enters and a second portion where the energy exits, the waveguide including: a core layer with an index of refraction, $n1$; at least one cladding layer formed adjacent the core layer, the cladding layer having an index of refraction, $n2$; a reflective layer, the reflective layer positioned adjacent the first portion of the waveguide; and an interlayer, the interlayer positioned between the first portion of the waveguide and the reflective layer, the interlayer having an index of refraction, $n3$; wherein $n3$ is greater than $n2$.

A system that includes magnetic storage medium; a recording head that is movable relative to the storage medium and that is adapted to record data to the storage medium, the recording head including an energy source, the energy having a wavelength $\lambda$; an optical system comprising one or more components configured to direct the energy from the energy source into an optical device, the optical device including a waveguide, the waveguide having a first portion where the energy enters and a second portion where the energy exits, the waveguide including a core layer with an index of refraction, $n1$; a first and second cladding layers configured so that the core layer is between the first and second cladding layers, the cladding layers having an index of refraction, $n2$; a reflective layer, the reflective layer positioned adjacent the first portion of the waveguide; and an interlayer, the interlayer positioned between the first portion of the waveguide and the reflective layer, the interlayer having an index of refraction, $n3$; wherein $n3$ is greater than $n2$.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
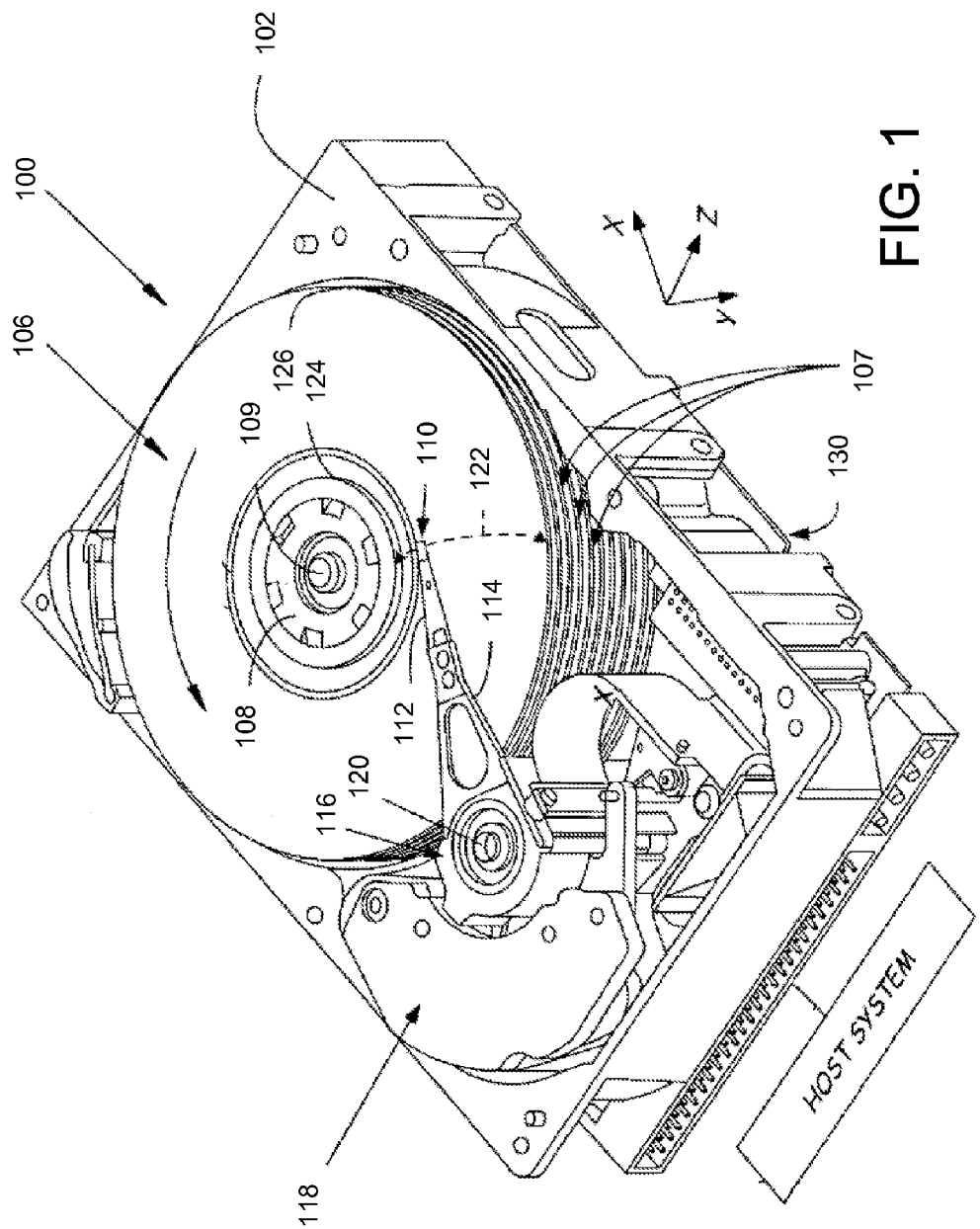
FIG. 1 is an isometric view of a system including a disc drive.

FIG. 1 is an isometric view of a disc drive 100 in which disclosed devices such as disclosed optical devices may be useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In general, the disc head slider 110 supports a recording head that can include disclosed optical devices. Disclosed optical devices included in the disc head slider 110 can be utilized to direct focused energy onto a surface of a disc 107 of the disc pack 106 to provide heat-assisted recording. A control circuit included with the servo electronics 130 or co-located with the servo electronics 130 along a bottom portion of the disc drive 100 may be used to control a position of the slider 110 and the associated read/write head relative to one of the individual discs 107 of the disc pack 106.

Figure 2:
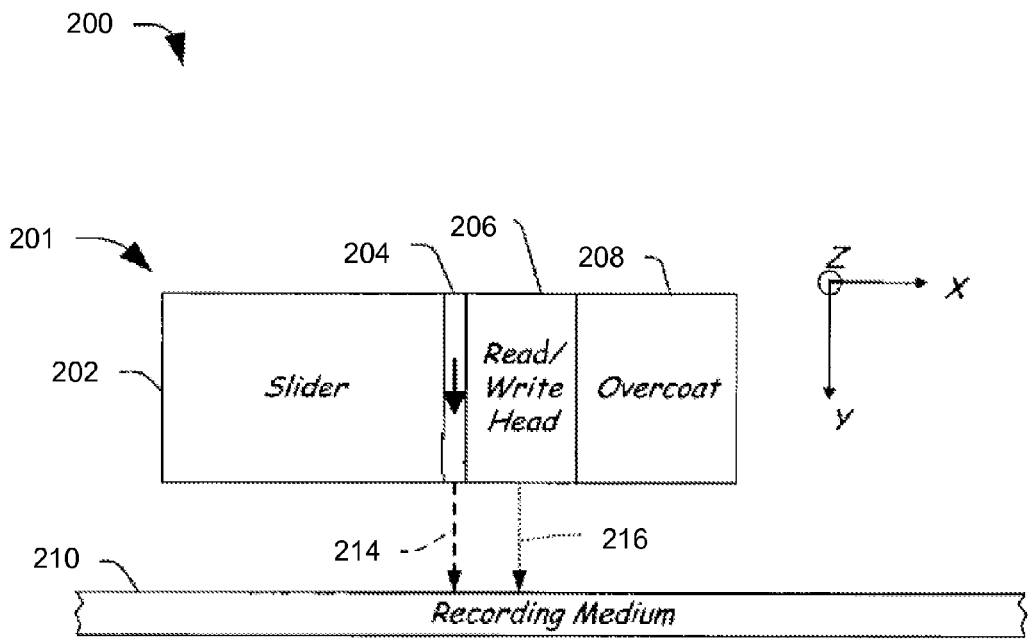
FIG. 2 is a block diagram of a particular illustrative embodiment of a recording head including a waveguide in communication with an illustrative recording medium.

FIG. 2 is a block diagram of a particular illustrative embodiment of a system 200 including a recording head 201 having an optical device 204 such as those depicted herein. The system 200 includes a recording medium 210 located perpendicular to a Y-axis of the optical device 204. The recording head 201 includes an air-bearing slider 202 that flies over the surface of the recording medium 210 and that is adapted to be adjusted in the X-direction and the Z-direction and that maintains a fly-height over the surface of the recording medium 210 in the Y-direction based on airflow. The air-bearing slider 202 is coupled to a read/write head 206, which is adjacent to the optical device 204. The optical device 204 focuses evanescent waveform energy toward the surface of the recording medium 210. The recording head 201 can optionally include overcoat layer 208 that functions to protect the read/write head 206.

In a particular embodiment, the optical device directs focused energy 214 onto the surface of the recording medium 210 to heat a local area of the recording medium 210 to reduce a coercivity of the local area. Concurrently, the read/write head 206 directs a recording field 216 onto the recording medium 210 in the heated local area to record data to the recording medium.

FIGS. 3-6 illustrate views of an embodiment of a disclosed device or more specifically a disclosed optical device. Disclosed optical devices discussed herein can also be referred to as planar solid immersion mirrors (PSIM). A planar solid immersion mirror or PSIM as used herein generally refers to an optical device that includes planar waveguide that has shaped edges for reflecting energy (or more specifically light for example) in a certain direction. The PSIM may be utilized to reflect light, for example, to a focal region or focal point. The PSIM can be configured as part of a recording head (read/write head 206 in FIG. 2 for example in which it can be optical device 204) and can specifically be mounted within or on a slider (such as slider 202 in FIG. 2 for example) for the purpose of heating a recording medium (such as recording medium 210 in FIG. 2 for example).

Figure 4:
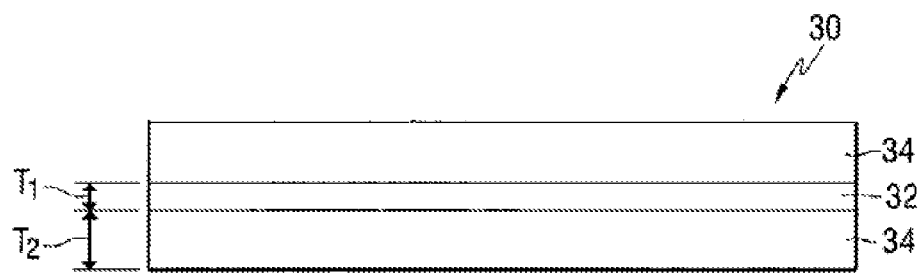
FIG. 4 is a sectional view taken along line 4-4 of FIG. 3.
Figure 5:
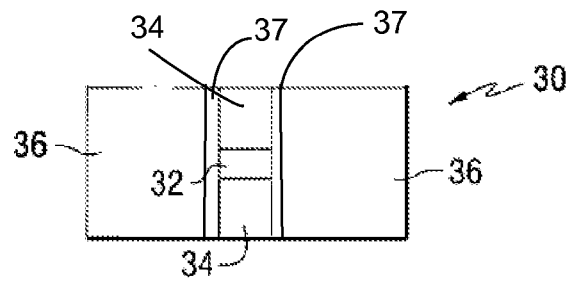
FIG. 5 is a sectional view taken along line 5-5 of FIG. 4.
Figure 6:
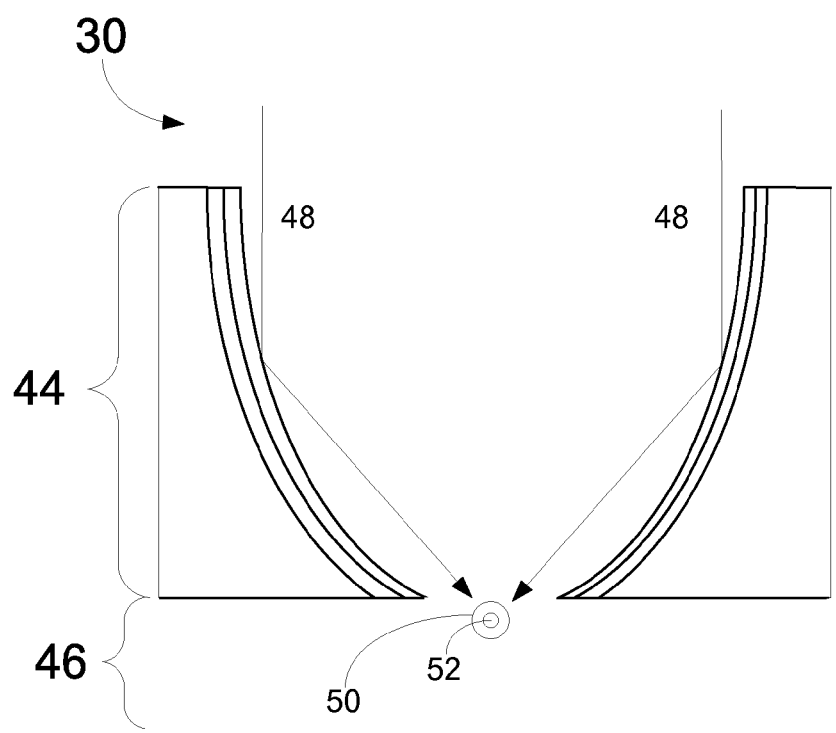
FIG. 6 is a partial sectional view taken along line 6-6 of FIG. 5.

A certain disclosed optical device or PSIM 30 depicted in FIGS. 3-6 may include a waveguide 31. A waveguide 31 can generally include multiple layers of material having varying refractive indexes. The waveguide disclosed in FIGS. 3-6 can be characterized as including a first portion and a second portion. The first portion can generally be described as the portion where the energy or light enters the waveguide and is transmitted through the waveguide. The second portion can generally be described as the portion where the energy or light exits the waveguide. The first portion 44 and the second portion 46 are designated as such in FIG. 3. FIG. 6 also shows the first portion of the waveguide 44 and the second portion of the waveguide 46. In some embodiments, the first portion of the waveguide can be described as being parabolically shaped. A waveguide may have a parabolically shaped first portion when the beam of energy incident onto the waveguide is collimated. The exemplary PSIM depicted in FIGS. 3 to 6 has a parabolically shaped first portion. The parabolic nature of the first portion of the exemplary waveguide can be further characterized by the edges 38 and 40 of the waveguide (shown in FIG. 3). In some embodiments, the first portion of the waveguide can be described as being elliptically shaped. A waveguide may have an elliptically shaped first portion when the beam of energy incident onto the waveguide comes from a finite-sized source, such as the output of a three-dimensional channel waveguide for example.

As described herein, the sides 38 and 40 of the waveguide 31 are shaped to direct a propagating electromagnetic planar waveguide mode, e.g., electromagnetic waves 48, to the focal region 50. An exemplary geometry for determining the shape of the sides 38 and 40 can be found in U.S. Patent Publication No. 2007/0115787, the disclosure of which is incorporated herein by reference thereto.

Figure 3:
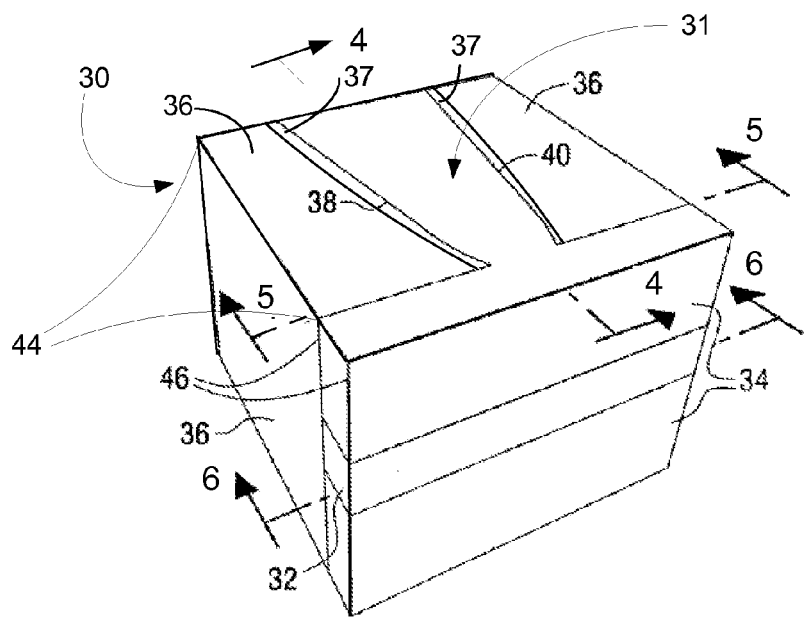
FIG. 3 is an isometric view of a particular illustrative planar solid immersion mirror.

The waveguide 31 can include a core layer 32 with at least one cladding layer 34 formed adjacent the core layer or on the sides thereof (see FIGS. 3-5). The core layer 32 can be made of a material that has an index of refraction, n1. The at least one cladding layer 34 (in FIGS. 3-5, there are two cladding layers) can be made of a material that has an index of refraction, n2. In some embodiments, n1 is greater than n2, i.e., the material of the core layer 32 may have a refractive index greater than the material of the cladding layer 34. This enables the core layer 32 to more efficiently transmit the light energy or electromagnetic wave for heating the recording medium. In some embodiments, the material of the core layer 32 may have a refractive index (n1) of about 1.9 to about 4.0. In contrast, the material of the cladding layer 34 may have a refractive index (n2) of about 1.0 to about 2.0. By forming the core layer 32 with a higher refractive index than the cladding layer 34, the core layer 32 is able to more efficiently guide a propagating or guided electromagnetic planar waveguide mode by total internal reflection. In addition, by increasing the ratio of the core layer 32 refractive index to the cladding layer 34 refractive index (for the refractive index ranges stated herein), the energy of the propagating or guided mode can be more greatly confined within the core layer 32. As used herein, the term propagating or guided electromagnetic planar waveguide mode generally refers to optical modes which are presented as a solution of the eigenvalue equation, which is derived from Maxwell's equations subject to the boundary conditions generally imposed by the waveguide geometry.

The core layer 32 may be formed of a material such as, for example, $Ta_2O_5$, $TiO_2$, ZnSe, Si, SiN, ZnS, $SiON_x$, GaP or GaN. In addition, the core layer 32 may have a thickness $T_1$ (see FIG. 4) of about 20 nm to about 500 nm. The cladding layer 34 may be formed of a material such as, for example, $SiO_2$, air, $Al_2O_3$, $SiON_x$, BeO, or $MgF_2$. The cladding layer 34 may have a thickness $T_2$ (see FIG. 4) in the range of about 200 nm to about 2000 nm. The cladding layer 34 should be sufficiently thick such that the electric field from the propagating waveguide mode does not extend appreciably beyond the cladding layer 34 and thereby interact with any materials or structure outside of the waveguide 31. By increasing the ratio of the core layer 32 thickness to the cladding layer 34 thickness (for the thickness ranges stated herein), the energy of the propagating mode can be more greatly confined within the core layer 32.

The optical device 30 may also include one or more reflective layers 36. The reflective layer can be positioned adjacent the first portion of the waveguide. In some embodiments, the reflective layer 36 can be described as being positioned adjacent, but not directly adjacent to the edges of the waveguide. In some embodiments, the reflective layer 36 can completely surround the waveguide. In some embodiments, the reflective layer 36 can be a single structure that surrounds the entire waveguide 31. In some embodiments, the reflective layer 36 can comprise more than one structure. The reflective layer can also be described as being formed along the reflective edges or sides 38 and 40. The reflective layer 36 can serve to minimize low loss reflection of the electromagnetic waves from the waveguide 31. The reflective layer or layers 36 may be formed of materials such as gold (Au), silver (Ag), aluminum (Al), copper (Cu), platinum (Pt) or iridium (Ir) for example. In some embodiments, the reflective layer may have a thickness from about 100 nm to about 500 nm.

The optical device 30 may also include an interlayer 37. The interlayer 37 can be positioned adjacent the first portion of the waveguide and the reflective layer 36. The interlayer 37 can be seen in FIGS. 3, 5, and 6 for example. The interlayer 37 can also be described as being positioned between the first portion or the edges 38 and 40 of the waveguide 31 and the reflective layer 36. In some embodiments, the interlayer 37 can completely surround the waveguide. In some embodiments, the interlayer 37 can be a single structure that surrounds the entire waveguide 31. In some embodiments, the interlayer 37 can comprise more than one structure. The interlayer 37 can function to improve the reflectivity of the device and decrease the optical phase variation of field that exits the waveguide (when compared to a device without the interlayer). The interlayer 37 can be made of a dielectric material. The interlayer 37 may be formed of a material with an index of refraction of n3. Generally, the index of refraction n3 of the interlayer material is not less than, and in some embodiments greater than the index of refraction of the cladding layer material n2. In some embodiments, the interlayer 37 can be made of materials that can also be utilized for the core layer 32. For example, the interlayer 37 may be formed of materials such as $Ta_2O_5$, $TiO_2$, ZnSe, Si, SiN, ZnS, $SiON_x$, $Ye_2O_3$, GaP or GaN.

The thickness of the interlayer 37 can be related to the wavelength of the energy that is to be transmitted by the waveguide. The wavelength of the energy from the energy source is described herein as λ. The following explains in more detail, the relationship of the thickness of the interlayer to the wavelength of the energy source, λ. The following variables are used in the following equations: β—propagation constant of the waveguide; $n_2$—the index of refraction of the dielectric layer; $n_3$—complex refractive index of the metallic sidewall; d—thickness of the dielectric layer; θ—optical ray angle of incidence on the dielectric layer; and λ—light wavelength in vacuum. The analysis begins with the following four equations:

$$k_{rx} = \beta \sin \theta \quad \text{(Eqn. 1)}$$

$$k_{r1z} = \sqrt{\beta^2 - k_{rx}^2} \quad \text{(Eqn. 2)}$$

$$k_{r2z} = \sqrt{n_2^2 - k_{rx}^2} \quad \text{(Eqn. 3)}$$

$$k_{r3z} = \sqrt{n_3^2 - k_{rx}^2} \quad \text{(Eqn. 4)}$$

For a TE (transverse electric, the electric field is parallel to the planar waveguide plane) mode:

$$r_{12} = \frac{\frac{k_{r1z}}{\beta^2} - \frac{k_{r2z}}{n_2^2}}{\frac{k_{r1z}}{\beta^2} - \frac{k_{r2z}}{n_2^2}} \quad \text{(Eqn. 5)}$$

$$r_{23} = \frac{\frac{k_{r2z}}{n_2^2} - \frac{k_{r3z}}{n_3^2}}{\frac{k_{r2z}}{n_2^2} + \frac{k_{r3z}}{n_3^2}} \quad \text{(Eqn. 6)}$$

For a TM (transverse magnetic, the magnetic field id parallel to the planar waveguide plane) mode:

$$r_{12} = \frac{k_{r1z} - k_{r2z}}{k_{r1z} + k_{r2z}} \quad \text{(Eqn. 7)}$$

$$r_{23} = \frac{k_{r2z} - k_{r3z}}{k_{r2z} + k_{r3z}} \quad \text{(Eqn. 8)}$$

The reflection coefficient, r, at the waveguide/dielectric layer can be derived to be (Eqn. 9):

$$r = |r|e^{j\phi} = \frac{r_{12} + r_{23}\exp\left(jk_{r2z}\frac{4\pi}{\lambda}d\right)}{1 + r_{12}r_{23}\exp\left(jk_{r2z}\frac{4\pi}{\lambda}\right)}$$ (Eqn. 9)

where the amplitude of r determines the reflectivity, $R=|r|^2$ and $\phi$ denotes the reflection phase. Note that both the reflectivity and reflection phase depend on the angle of incidence. The thickness (d) of the dielectric layer can be obtained by maximizing the reflectivity while simultaneously minimizing the phase variation over the angle of incidence. In certain embodiments, the thickness of the interlayer may be from about $0.8\lambda$ to about $1.2\lambda$. In certain other embodiments, a desired thickness or range of thicknesses of the interlayer can be calculated utilizing the above formulas and other relevant properties (as provided in Eqn. 9—for example: refractive index of the material of the interlayer, material of the metallic layer, and the waveguide mode index) of the optical device.

Referring to FIG. 6, there is illustrated a partial sectional view of the optical device 30 with the sectional view taken along line 6-6 through the core layer 32 as shown in FIG. 3. The waveguide of the optical device 30 includes a first portion or reflective portion 44 and a second portion or non-reflective portion 46. The first portion 44 can also be described as the portion of the waveguide where the energy enters and is reflected; and the second portion 46 can be described as the portion of the waveguide where the energy exits the waveguide. The first portion includes the sides 38 and 40 which can also be characterized in this exemplary waveguide as having a parabolic shape for directing a propagating or guided electromagnetic planar waveguide mode, e.g., electromagnetic waves represented by arrows 48, toward a focal region 50 so as to generate an optical spot 52. The focal region 50 and the optical spot 52 are contained at least partially within the second portion 46 of the waveguide 31 and can be adjacent an air-bearing surface (ABS) of a slider.

The optical device 30 may also include or be configured with other optical components within an optical system for example. Generally, such an optical system can be designed to direct energy from an energy source to a magnetic recording medium. Other components (in addition to the disclosed optical devices) can be designed to direct energy into or from disclosed optical devices. Exemplary additional optical components that can be included in such optical systems can include grating couplers, mirrors, gratings, beam splitters, three-dimensional waveguides, and waveguide tapers. Energy sources, such as for example laser diodes, and other light emitting devices be configured along with such a disclosed optical system to provide the energy to the optical system.

Also disclosed herein are systems that include magnetic storage media (an example of which was illustrated and discussed with respect to FIGS. 1 and 2); a recording head (an example of which was illustrated and discussed with respect to FIGS. 1 and 2) that is movable relative to the storage media and is adapted to record data to the storage medium. Such a recording head can include an energy source that generates energy having a wavelength, $\lambda$. Exemplary types of energy sources can include those illustrated above. The recording head can also include a magnetic read/write head and an optical system (such as that described above) including disclosed optical devices, or more specifically disclosed PSIMs. In some embodiments, the components of the system can be configured so that energy from the energy source heats the magnetic storage medium to assist the magnetic read/write head in writing data to the magnetic storage medium.

The present disclosure is illustrated by the following examples. It is to be understood that the particular examples, assumptions, modeling, and procedures are to be interpreted broadly in accordance with the scope and spirit of the invention as set forth herein.

EXAMPLES

Comparative Example 1

The following analysis is for a PSIM where light is confined by the waveguide in the direction normal to the waveguide plane. When a waveguide mode, for instance, $TE_0$ mode, is incident on a metallized sidewall, it is frustrated near the sidewall, reflected and re-coupled into the waveguide. For this simulation it is assumed that the waveguide consists of a 120-nm thick core $Ta_2O_5$ layer sandwiched between two $Al_2O_3$ cladding layers. The light is assumed to have a wavelength $\lambda=830$ nm, the index of refraction of the $Ta_2O_5$ core layer $n=2.15$, and that of $Al_2O_3$ cladding layers $n=1.65$. For this waveguide $TE_0$ mode has propagation constant $\beta=1.794$. This model was run with two different materials for the reflective layer—one being highly reflective and one less reflective. The highly reflective material chosen was gold. Its refractive index is $n=0.188+j5.39$. To low reflective material chosen was aluminum. Its refractive index is $n=2.74+j8.31$.

Figure 7A:
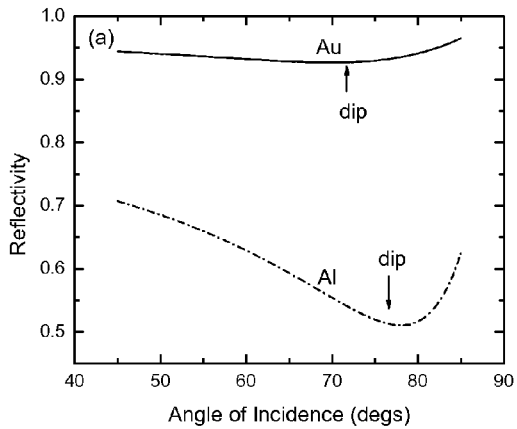
FIGS. 7a and 7b show reflectivity (FIG. 7a) and optical phase (FIG. 7b) of modeled waveguides including reflective layers of gold and aluminum versus the angle of incidence for a p-polarized incident beam. The medium of incidence has a refraction of index $n=1.794$; and the wavelength of the light=830 nm.
Figure 7B:
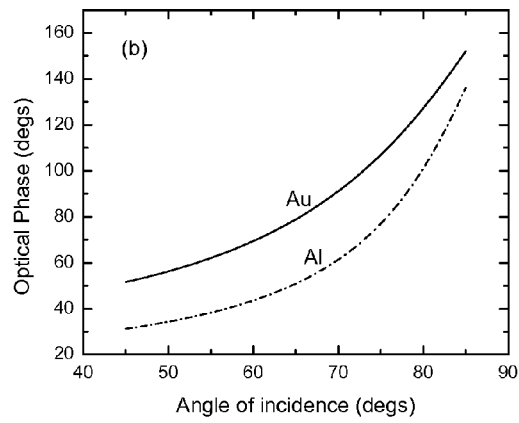

In order to compute the reflection of the waveguide mode from a sidewall, the waveguide in the model was simplified to a homogeneous medium, whose refractive index is the same as the waveguide mode propagation constant. FIGS. 7a and 7b show the calculated Fresnel reflectivity (FIG. 7a) and optical phase (FIG. 7b) of light reflected from both the gold and the aluminum versus the angle of incidence from 45° to 85°.

As expected, gold has reflectivity R over 90% and aluminum has reflectivity as low as 50%. It is also seen that the optical phase gain varies with the angle of incidence. For gold, the optical phase varies from 50 degrees to 150 degrees, and for aluminum, it varies from 30 degrees to 140 degrees. Due to the variation of optical phase as a function of angle of incidence, optic rays that converge to a common focal point (the least confusion) will not have an equal optical path. This increases the focused spot size and decreases the focus peak intensity. Computation of the focusing based on Richard-wolf theory (B. Richards and E. Wolf, "Electromagnetic diffraction in optical system II: structure of the image field in an aplanatic system," Proc. Roy. Soc. Ser. A 253, 358-379 (1959)) shows the least confusion focal point is shifted by $0.19\lambda$ (156 nm) into the SIM.

Example 1

Calculation of Interlayer Thickness

Figure 8A:
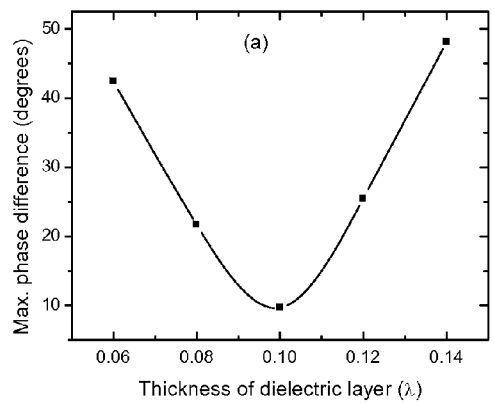
FIGS. 8a and 8b show the thickness of the interlayer (in terms of $\lambda$) versus both the maximum phase difference, in degrees (FIG. 8a) and the average reflectivity (FIG. 8b).
Figure 8B:
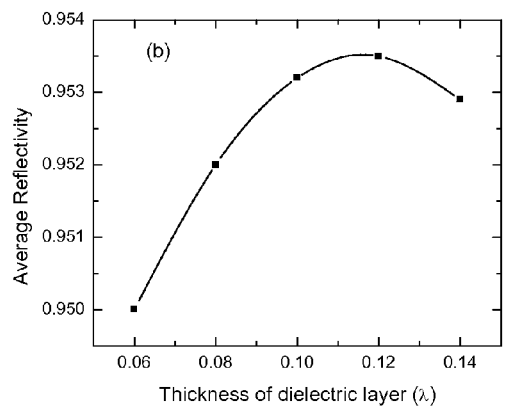

FIGS. 8a and 8b show the thickness of the interlayer (in terms of $\lambda$) versus both the maximum phase difference, in degrees (FIG. 8a) and the average reflectivity (FIG. 8b). As seen from these plots, when $d=0.1\lambda$, the phase variation is reduced to a minimum, only about 10°, which is a factor of 10 reduction from the case without a dielectric layer. The reflectivity is also nearly maximized at this thickness. As seen from FIG. 8b, at a thickness from about $0.08\lambda$ to $0.12\lambda$, the reflectivity is higher than 0.952 and the maximum phase difference is always less than about 25°.

Example 2

Comparison of a PSIM Including a Gold Reflective Layer with an Interlayer and without an Interlayer For this simulation it is assumed that the waveguide consists of a 120 nm thick core layer of $Ta_2O_5$ sandwiched between two $Al_2O_3$ cladding layers. The light is assumed to have a wavelength $\lambda=830$ nm, the index of refraction of the $Ta_2O_5$ core layer $n=2.15$, and that of $Al_2O_3$ cladding layers $n=1.65$. The reflective layer is gold that has an index of refraction of $n=0.188+j5.39$. The device without the interlayer does not include anything else and the device with the interlayer includes an interlayer of $Ta_2O_5$ that is assumed to have a thickness of $0.12\lambda$ or about 100 nm thick.

Figure 9A:
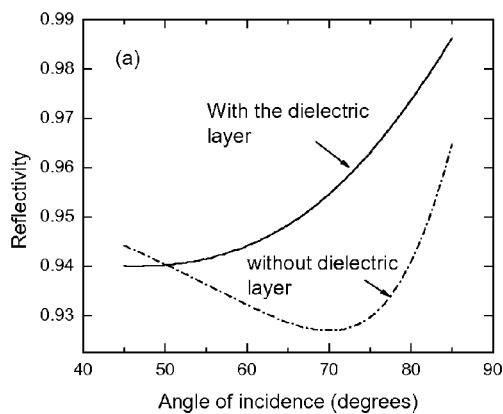
FIGS. 9a and 9b show reflectivity (FIG. 9a) and optical phase (FIG. 9b) of modeled waveguides including a gold reflective layer with and without (in FIG. 9a) an interlayer versus the angle of incidence for a p-polarized incident beam.
Figure 9B:
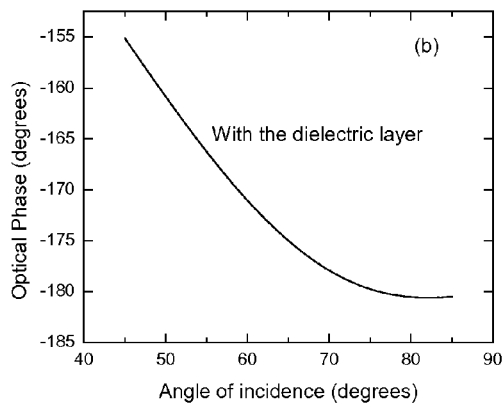

FIG. 9a shows the computed Fresnel reflectivity and FIG. 9b shows the optical phase for the PSIM with and without the interlayer. It is evident that the reflectivity is increased with the interlayer and the optical phase variation is only about 25 degrees. By comparing FIG. 9b with FIG. 7b, it is seen that the optical phase variation is 5 times less than that without the interlayer. Computation of focusing based on Richard-wolf theory shows that the focal point is only 5 nm from the geometric focal point outside. (It was 156 nm without the dielectric layer). Computation of PSIM focusing based on full-wave finite-difference time-domain (FDTD) technique on a mini-version of PSIM (10 μm opening and 8 μm height) also confirmed this result and that the FWHM (full width at half maximum intensity) spot size of the transverse electric component was reduced by 7%.

Example 3

Comparison of a PSIM Including an Aluminum Reflective Layer with an Interlayer and without an Interlayer For this simulation it is assumed that the waveguide consists of a 120 nm thick core layer of $Ta_2O_5$ sandwiched between two $Al_2O_3$ cladding layers. The light is assumed to have a wavelength $\lambda=830$ nm, the index of refraction of the $Ta_2O_5$ core layer $n=2.15$, and that of $Al_2O_3$ cladding layers $n=1.65$. The reflective layer is aluminum that has an index of refraction of $n=2.74+j8.31$. The device without the interlayer does not include anything else and the device with the interlayer includes an interlayer of $Ta_2O_5$ that is assumed to have a thickness of $0.12\lambda$ or about 100 nm thick.

Figure 10A:
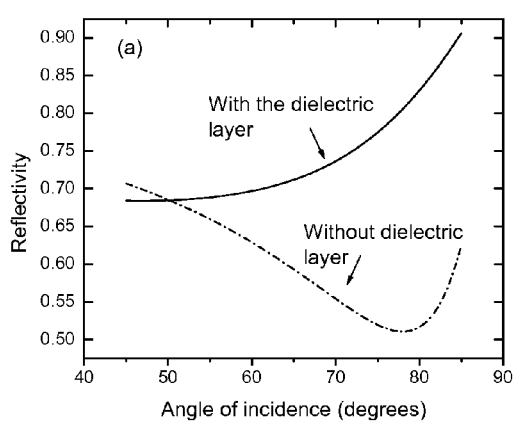
FIGS. 10a and 10b show reflectivity (FIG. 10a) and optical phase (FIG. 10b) of modeled waveguides including an aluminum reflective layer with and without (in FIG. 10a) an interlayer versus the angle of incidence for a p-polarized incident beam.
Figure 10B:
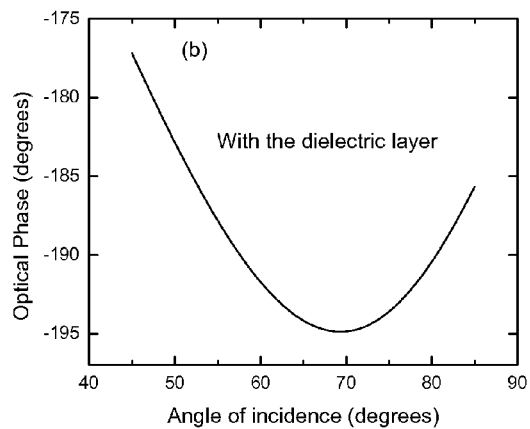

FIG. 10a shows the computed Fresnel reflectivity and FIG. 10b shows the optical phase for the PSIM with and without the interlayer. It is evident that the reflectivity is greatly enhanced with the interlayer and the optical phase variation is only about 20 degrees. In terms of optical delivery efficiency, it is about 20% higher. This small amount of phase variation will not shift the focal point. Computation of PSIM focusing based on FDTD technique on the mini-version of PSIM showed that the focal point is right at the geometric focal node and that peak of intensity of the focused spot is 10% greater for the case with the dielectric layer than that for the case without the dielectric layer. FWHM of the focused spot is also slightly improved.

What is claimed is:

1. A device comprising:
   a waveguide, the waveguide having a first portion where energy having a wavelength, $\lambda$, enters and a second portion where the energy exits, the waveguide comprising:
   a core layer with an index of refraction, n1;
   at least one cladding layer formed adjacent the core layer, the cladding layer having an index of refraction, n2;
   a reflective layer, the reflective layer positioned adjacent the first portion of the waveguide; and
   an interlayer, the interlayer positioned between the first portion of the waveguide and the reflective layer, the interlayer having an index of refraction, n3;
   wherein n3 is greater than n2.

2. The device according to claim 1, wherein the interlayer comprises $Ta_2O_5$, $TiO_2$, ZnSe, Si, SiN, ZnS, $SiON_x$, $Ye_2O_3$, GaP, or GaN.

3. The device according to claim 1, wherein the first portion of the waveguide is parabolically shaped.

4. The device according to claim 1, wherein the first portion of the waveguide is elliptically shaped.

5. The device according to claim 1, wherein the interlayer has a thickness of about $0.08\lambda$ to about $0.12\lambda$.

6. The device according to claim 1, wherein the reflective layer comprises silver (Ag), aluminum (Al), gold (Au), copper (Cu), iridium (Ir), or platinum (Pt).

7. The device according to claim 1, wherein the reflective layer has a thickness from about 100 nm to about 500 nm.

8. The device according to claim 1, wherein the core layer comprises $Ta_2O_5$, $TiO_2$, ZnSe, Si, SiN, ZnS, $SiON_x$, $Ye_2O_3$, GaP, or GaN.

9. The device according to claim 1, wherein the core layer has a thickness from about 20 nm to about 500 nm.

10. The device according to claim 1, wherein the cladding layer comprises $SiO_2$, $Al_2O_3$, $SiON_x$, BeO, $MgF_2$, or air.

11. The device according to claim 1, wherein the at least one cladding layer has a thickness of about 200 nm to about 2000 nm.

12. A device comprising:
    an energy source, the energy having a wavelength $\lambda$;
    an optical system comprising one or more components configured to direct the energy from the energy source into an optical device, the optical device comprising:
    a waveguide, the waveguide having a first portion where the energy enters and a second portion where the energy exits, the waveguide comprising:
    a core layer with an index of refraction, n1;
    at least one cladding layer formed adjacent the core layer, the cladding layer having an index of refraction, n2;
    a reflective layer, the reflective layer positioned adjacent the first portion of the waveguide; and
    an interlayer, the interlayer positioned between the first portion of the waveguide and the reflective layer, the interlayer having an index of refraction, n3;
    wherein n3 is greater than n2.

13. The device according to claim 12, wherein the interlayer comprises $Ta_2O_5$, $TiO_2$, ZnSe, Si, SiN, ZnS, $SiON_x$, $Ye_2O_3$, GaP, or GaN.

14. The device according to claim 12, wherein the first portion of the waveguide is parabolically shaped.

15. The device according to claim 12, wherein the first portion of the waveguide is elliptically shaped.

16. The device according to claim 12, wherein the interlayer has a thickness of about $0.08\lambda$ to about $0.12\lambda$.

17. A system comprising:
    magnetic storage medium;
    a recording head that is movable relative to the storage medium and that is adapted to record data to the storage medium, the recording head comprising:
    an energy source, the energy having a wavelength $\lambda$;

an optical system comprising one or more components configured to direct the energy from the energy source into an optical device, the optical device comprising:

a waveguide, the waveguide having a first portion where the energy enters and a second portion where the energy exits, the waveguide comprising:

a core layer with an index of refraction, n1;

a first and second cladding layers configured so that the core layer is between the first and second cladding layers, the cladding layers having an index of refraction, n2;

a reflective layer, the reflective layer positioned adjacent the first portion of the waveguide; and an interlayer, the interlayer positioned between the first portion of the waveguide and the reflective layer, the interlayer having an index of refraction, n3;

wherein n3 is greater than n2.

18. The system according to claim 17, wherein the recording head further comprises a magnetic read/write head and the system is configured so that energy from the energy source heats the magnetic storage medium to assist the magnetic read/write head in writing data to the magnetic storage medium.

19. The system according to claim 17, wherein the interlayer comprises $Ta_2O_5$, $TiO_2$, $ZnSe$, $Si$, $SiN$, $ZnS$, $SiON_x$, $Ye_2O_3$, $GaP$, or $GaN$.

20. The system according to claim 17, wherein the first portion of the waveguide is either parabolically shaped or elliptically shaped.

* * * * *